United States Patent
Nonnenmacher et al.

(10) Patent No.: US 7,416,713 B2
(45) Date of Patent: Aug. 26, 2008

(54) DEOZONATING DEVICE WITH INTEGRATED HEAT EXCHANGER

(75) Inventors: Klaus Nonnenmacher, Tübingen (DE); Guido Rohrbach, Reutlingen (DE)

(73) Assignee: Anseros Klaus Nonnenmacher GmbH, Tubingen-Hirschau (DE)

( * ) Notice: Subject to any disclaimer, the term of this patent is extended or adjusted under 35 U.S.C. 154(b) by 324 days.

(21) Appl. No.: 11/257,496

(22) Filed: Oct. 24, 2005

(65) Prior Publication Data

US 2006/0127292 A1   Jun. 15, 2006

(30) Foreign Application Priority Data

Oct. 25, 2004   (DE) .................. 10 2004 051 945

(51) Int. Cl.
*B01D 53/66* (2006.01)
*B01J 19/00* (2006.01)

(52) U.S. Cl. ............... 423/219; 422/129; 422/168; 422/173; 422/176

(58) Field of Classification Search .............. 423/219; 422/129, 168, 173, 176
See application file for complete search history.

(56) References Cited

U.S. PATENT DOCUMENTS

| | | | |
|---|---|---|---|
| 5,951,957 A * | 9/1999 | Simpson | 423/219 |
| 6,328,941 B1 | 12/2001 | Watzenberger | 423/235 |
| 6,471,925 B1 | 10/2002 | Merchant | 53/62 |
| 6,848,501 B2 | 2/2005 | Hirao | 165/119 |
| 7,037,878 B2 | 5/2006 | Liu | 502/326 |
| 2003/0202916 A1 | 10/2003 | Liu | 422/177 |

FOREIGN PATENT DOCUMENTS

| | | |
|---|---|---|
| DE | 2535087 | 2/1977 |
| DE | 3811588 | 10/1989 |
| DE | 4012119 | 10/1991 |
| DE | 4024271 | 2/1992 |
| DE | 199 02 109 | 7/2000 |
| DE | 600 07 811 | 11/2004 |
| JP | 2001027157 | 1/2001 |

* cited by examiner

*Primary Examiner*—Timothy C Vanoy
(74) *Attorney, Agent, or Firm*—Andrew Wilford

(57) ABSTRACT

The invention is concerned with a device of destroying ozone in gases by employing a recuperative plate heat exchanger (1) and an integrated electrical heating element (19, 21). The recuperative plate heat exchanger (1) is equipped with at least two planes, a preheating plane (11) and a recooling plane (13), whereby the flow direction of the gas treated in the recooling plane (13) is reversed relative to the ozone-containing gas in the preheating plane (11). Preferably, the flow directions of the preheating plane (11) and the recooling plane (13) cross over. The electrical heating element (19, 21) is situated in a reaction chamber (3) and heats up the ozone-containing gas preheated in the heat-exchanger up to temperatures of 350° C. or more, and thus destroys the ozone within the gas almost to completion. The plate heat exchanger (1) works almost without pressure losses.

12 Claims, 2 Drawing Sheets

DEOZONATING DEVICE WITH INTEGRATED HEAT EXCHANGER

FIELD OF THE INVENTION

The invention is concerned with a device and a method for deozonating, that is destroying ozone, in gases and including an integrated heat exchanger.

BACKGROUND OF THE INVENTION

Starting-point for the invention was a problem that exists in the semi-conductor industry where ozone is used to thoroughly clean so-called wafers. In this process, the wafers which have been brought into a chamber are flushed with water, and gases with high concentrations of ozone are separately introduced into the chamber. Due to its high ozone concentration, the ozone that is not converted in the course of the cleaning process has to be completely destroyed for safety reasons. To this end, it was common to pass the gas containing ozone escaping from the wafer chamber over aluminum oxide and deozonate it by means of UV radiation in the range of 254 nm and exposure to a temperature of approximately 70° C. However, if a dose of 0.1% hydrofluoric acid is additionally introduced into the wafer chamber for cleaning purposes, a portion of which also will be discharged from the wafer chamber and thus conducted over the aluminum oxide. The aluminum oxide will instantly react with the hydrofluoric acid and will become useless.

Another method known to remove residual ozone consists in its thermal destruction at temperatures >350° C., a process characterized by a high consumption of energy. In order to minimize this high energy consumption, the prior art already suggested connecting a heat exchanger in series upstream or downstream, in order to heat up the gas. In the course of this process, the cold gas led into the device is then pre-heated with the hot, ozone-free gas discharged from the device. Thus, the full energy requirement in the form of heat energy no longer has to be brought in, instead, only the respective heat losses need to be compensated. According to the state of the art it is customary in this method to employ shell-and-tube exchangers having a coaxial arrangement of the tubes or a so-called revolver construction. However, in this case it is disadvantageous that such a tubular flow is characterized by a relatively high pressure drop and accordingly requires a large structural volume.

In order to destroy ozone in an aircraft environmental control system, U.S. Pat. No. 7,037,878 proposes a catalytic converter with a staggered arrangement of rib-shaped elements having a coating consisting of the catalyst and anodized layers on one face. The anodized layers serve as a support for the catalyst, providing an additional surface for an improved distribution of the catalyst. After leaving the converter, the airflow thus cleared of ozone is conducted over a heat exchanger, the construction of which is not being mentioned in further detail.

From U.S. Pat. No. 6,328,941, the use of recuperative heat exchangers has become known to be applicable in the thermal decomposition of $N_2O$ in gases containing $N_2O$. Temperatures of from 800 to 1,200° C. are required for this thermal decomposition.

The heat exchanger has solid-bed bulk material composed of inert particles, e.g. $Al_2O$ rings that are heated up to the required working temperature.

The heat exchanger is thus a reaction chamber and heat exchanger in one. The converted gas is cooled down by means of heat exchange, while the heat-carrying elements and the new gas to be converted preheated.

In addition, a method for a very specialized application has become known from U.S. Pat. No. 6,848,501, to prevent clogging in a plate heat exchanger developed for heating and cooling of a gas containing deposit-forming components. This gas is released in the process of producing (meth)acrylic acid or (meth)acrylic acid esters. The plate exchanger is modified in such a way that its flow-through width is exactly defined and its inlet is provided with a gas dispersion plate.

OBJECT OF THE INVENTION

It is an object of the present invention to provide a device and a method for destroying ozone, allowing for the destruction of ozone in a most simple and economic way, and in particular to employ a heat exchanger that has a minimum necessary pressure drop, and that can be installed as small a space as possible.

SUMMARY OF THE INVENTION

This problem was solved by a device for deozonating gases, including a heat exchanger composed of two parts separated from each other and heat-exchange contact with each other, and a reaction chamber for ozone destruction. The reaction chamber is connected downstream of a collecting chamber for the gas containing ozone, and/or upstream of a distribution chamber for the essentially ozone-free gas. The one heat-exchanger part has an inlet for the ozone-containing gas to be heated and leads to the reaction chamber, while the other heat-exchanger part leads from the reaction chamber to an outlet for the gas which is essentially free of ozone and to be cooled down, thereby reversing the flow direction. Both parts are formed by plates lying close to each other and each defining a planar passage, with the part allocated to the ozone-containing gas constituting the planar preheating passage, and the part allocated to the essentially ozone-free gas constituting the planar cooling passage, each part comprising at least one such planar preheating or cooling passage. The planar preheating passage or passages and cooling passage or passages are arranged in such a manner that they have heat-exchange contact.

In accordance with a preferred embodiment, the part into which the gas containing ozone flows and the part through which the cooled, essentially ozone-free gas leaves the heat exchanger are oriented relative to each other in such a manner that the directions of the gases flowing in and out cross.

Thus, according to invention, a recuperative heat exchanger is provided that is designed as a plate-type heat exchanger. This arrangement makes it possible to preheat the incoming ozone-containing gas with the outgoing essentially ozone-free gas that is concomitantly cooled down almost without incurring any pressure losses. Due to the reversal of the flow direction of the gas that is essentially free of ozone and flows out of the heat exchanger relative to the inflowing gas containing ozone, the gases flow through both parts of the heat exchanger in principle, relative to each other, in counterflow. Preferably, the flow directions of the incoming ozone-containing gas to be heated up cross over the essentially ozone-free gas to be cooled down on its way to the outlet. This assures a maximum temperature difference and thus a maximum possible heat exchange, particularly since the planar preheating and cooling passages effecting the heat exchange are situated in close heat-exchange contact with one another, while an optimum of compactness concerning the construction of the device is provided.

In this regard, the success of the device according to the present invention is not necessarily limited to a combination of a reversed flow direction and the crossing of the flow directions. Depending on requirements, the result may prove sufficient, even if a crossing arrangement of the flow directions is not provided.

In case the inflowing gas contains organic substances possessing chemical double bonds in addition to ozone, the temperature of the planar preheating passage will normally be sufficient to crack the organic double bonds therein.

The device according to the invention is structurally designed so that a collecting chamber for the ozone-containing gas precedes or is upstream of the reaction chamber, and/or a distribution chamber for the essentially ozone-free gas is provided downstream of the reaction chamber. This is particularly efficient if the one part holding the ozone-containing gas to be heated up, and/or the other part in which the essentially ozone-free gas to be cooled down is led to the outlet, are each composed of several respective preheating or cooling passages. The collecting chamber for the ozone-containing gas will then serve to combine the gases from all the planar preheating passages, and the distribution chamber will serve to conduct the essentially ozone-free gas into the respective planar cooling passages.

According to the invention it is possible that there is at least one more planar cooling passage in the heat exchanger than in the planar preheating passages. This is advisable because the pressure of inflowing ozone-containing gas increases as it is heated.

The reaction chamber of the device according to the invention comprises at least one heating element with which the gas containing ozone is brought to a temperature required for destruction of the ozone. In general, the device according to the invention works very economically, since the amount of heat energy supplied by the heating element equals the temperature differential between the gaseous flows at the inlet and the outlet of the heat exchanger, provided there is good insulation.

The collecting chamber and the distribution chamber are, according to another embodiment of the device of the present invention, arranged in such a manner that the distribution chamber is positioned opposite to the at least one planar preheating passage, and the collecting chamber to the at least one planar cooling passage. Simple constructional measures thus ensure that the flow directions of the inflowing, ozone-containing gas to be heated and the essentially ozone-free, outflowing gas cross each other in the planar preheating passage(s) and the planar cooling passage(s).

The problem as mentioned at the beginning is also solved by a method for deozonating gases wherein the gas containing ozone flows through an inlet to a first part of a heat exchanger and is led through a collecting chamber to a reaction chamber for ozone destruction in which the gas is heated by at least one heating element up to a temperature at which ozone is destroyed, whence the hot deozonated gas then passes to a distribution chamber and is led, essentially free of ozone, into another part of the heat exchanger in an opposite gas-flow direction to a gas outlet, whereby the inflowing and outflowing gases flow between plates forming at least one plane in the inflowing as well as in the outflowing directions. At least one plane in the inflowing direction constitutes the planar preheating passage, and at least one plane in outflowing direction constitutes the planar cooling passage, so that the outflowing gas of the planar cooling passage(s) heats up the inflowing gas of the planar preheating passage(s) by means of heat exchange between the planes, the outflowing gas of the planar cooling passage being cooled concomitantly.

The planar preheating passage(s) are arranged in close contact to the planar cooling passage(s), thus permitting efficient heat exchange.

By applying the method according to the present invention, the gas is led into a collecting chamber once it has flowed through the plane(s) belonging to the first part and then into the reaction chamber. As already stated further above with regard to the device of the present invention, this is particularly effective, when there is more than one planar preheating passage, in order to permit combining of the gas in the collecting chamber and conducting it from there into the reaction chamber.

Accordingly, the gas leaving the reaction chamber is conducted into a distribution chamber, whence it is led countercurrent to the inflowing gas to the outlet. The distribution chamber takes over distributing the purified, essentially ozone-free gas to the various planar cooling passages. In this regard, it is highly preferred that there are at least one more planar cooling passage than planar preheating passage since the pressure of the gas is increased by its heating in the planar preheating passage.

In accordance with another embodiment of the method of the present invention, it is possible that the flow directions of the inflowing gas containing ozone and the outflowing, essentially ozone-free gas cross.

The method according to the present invention can be successfully applied to both dry and humid, water-containing gases.

In order to accomplish the thermal destruction of ozone, the gas is heated in the reaction chamber up to at least 300° C., preferably up to 350° C., and most preferably up to temperatures above 350° C.

The device for deozonating gases according to the present invention and the corresponding method are preferably applied in systems that the semi-conductor industry requires to completely destroy the high ozone concentrations used for cleaning of wafers. For this purpose the device of the present invention is also particularly advantageous, because, owing to its construction as a plate heat exchanger with integrated reaction chamber and integrated electrical heating appliance, it represents an extremely compact device not taking up much space, as demanded by the semi-conductor industry.

BRIEF DESCRIPTION OF THE DRAWINGS

The invention is described in greater detail in the following, wherein.

DETAILED DESCRIPTION OF, THE INVENTION

Figure 1:
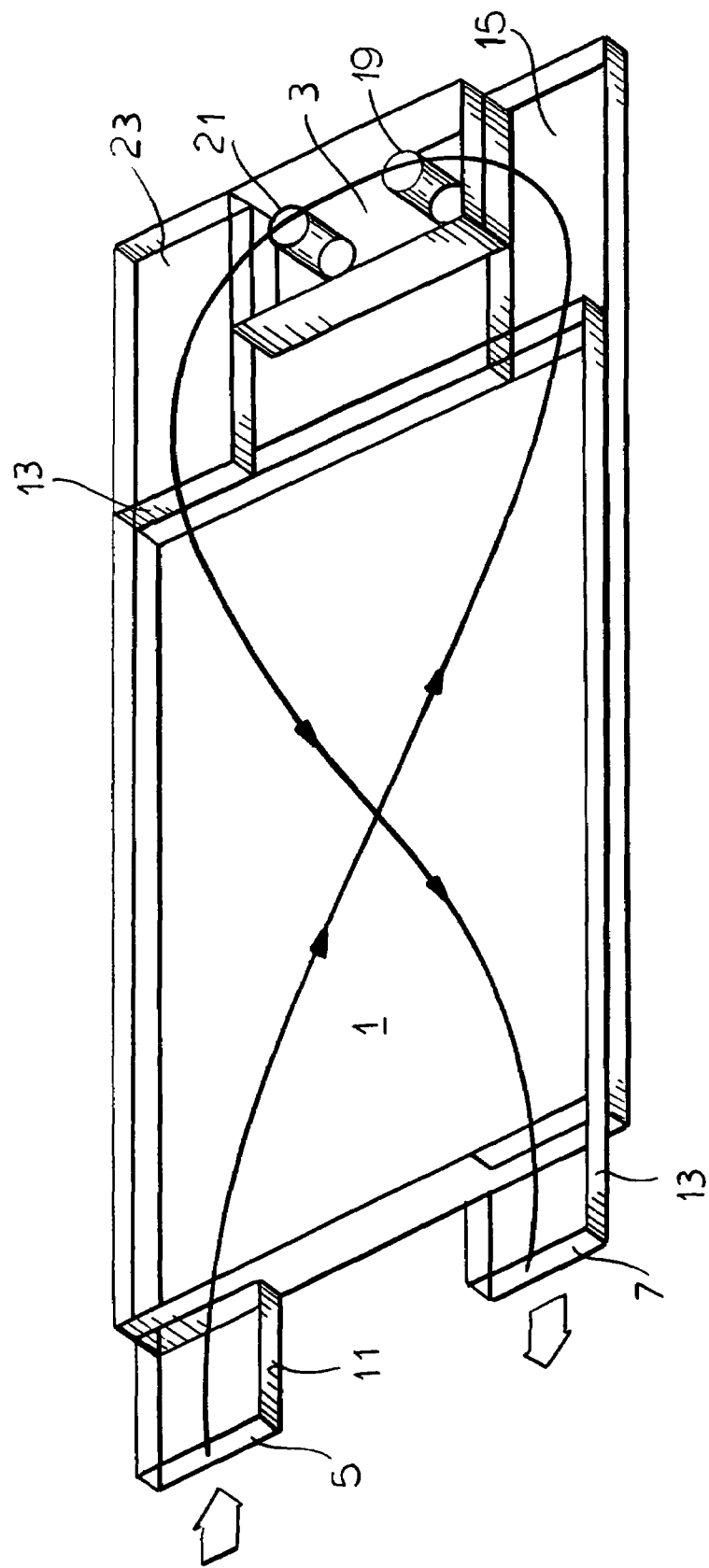
FIG. 1 is a schematic, partially schematic representation of the device for deozonating gases according to the present invention, using a recuperative heat-exchanger with crossing flow directions.

Reference is made to FIG. 1 that shows a device for deozonating gases that itself comprises a heat-exchanger 1 and a reaction chamber 3 for the destruction of ozone. Ozone-containing gas to be heated enters the exchanger 1 at inlet 5 and essentially ozone-free gas to be cooled down exits the exchanger at an outlet 7. The heat-exchanger 1 is configured as a recuperative heat-exchanger that has no seals and that serves to transfer heat from the essentially ozone-free gas to the ozone-containing gas, without any physical contact between the two gases, i.e. without mixing the gas containing ozone with the essentially ozone-free gas. Therefore two parts must be defined in the heat-exchanger 1. The one area or part with inlet 5 for the ozone-containing gas to be heated, which flows toward the reaction chamber 3, and the other area or part with the outlet 7 for the essentially ozone-free gas to be cooled, which flows from the reaction chamber 3 toward the outlet 7.

Both parts are formed by closely juxtaposed plates 9 that ensure good heat exchange between the gas coming in via the inlet 4 and the gas flowing out to the outlet 7, and each of these parts defines at least one plate plane. The heat-exchanger 1 shown in FIG. 1 comprises at least two such plate planes. In the part for the ozone-containing gas this plane serves as a planar preheating passage 11, whereas in the part for the ozone-free gas it serves as a planar cooling passage 13. It is reasonable for economic reasons to provide several planar preheating passages 11 and planar cooling passages 13. Due to compression of the gas during heating, the number of the planar cooling passages 13 should be at least one more than the number of planar preheating passages 11. For a better overview, the heat-exchanger 1 shown in FIG. 1 is not equipped with an array of planes. The plates 9 of heat-exchanger 1 in this embodiment consist of stainless steel welded gas-tight.

The ozone-containing gas is conducted from the one planar preheating passage 11 as shown to a collecting or manifold chamber 15 which essentially combines the ozone-containing gas from the various planar preheating passages 11 and leads it into the reaction chamber 3. In the FIG. 1 embodiment, the reaction chamber 3 has two heating elements 19, 21, that heat the ozone-containing gas up to more than 350° C. The temperature is controlled by a thermoelectric element that is not shown in the FIG. 1. In this embodiment, the ozone in the reaction chamber 3 is destroyed spontaneously by the temperature exceeding 350° C.

The reaction chamber 3 is not the only site where destruction of ozone takes place in the device according to the present invention. Because of the temperature in the planar preheating passage 11 of the heat-exchanger 1, ozone will be destroyed there as well. The planar preheating passage 11 essentially contributes to the reaction enthalpy. Owing to the preheating capacity of the heat-exchanger 1 in the pre-treatment plane 11, it must be assumed that the temperature inside the collecting chamber 15 will inherently be approximately 300° C. This temperature is sufficient to destroy a considerable amount of the ozone. However, the essentially complete destruction of ozone is only accomplished in the reaction chamber 3.

The hot, essentially ozone-free gas is conducted from the reaction chamber 3 into the distribution chamber 23 that leads the gas to the various planar cooling passages 13. Since the planar cooling passage(s) 13 are in close contact with the plate, or plates, in such a manner that the plates of the respective stages immediately adjoin, the ozone-free gas flowing from the distribution chamber 23 toward the outlet 7 in the opposite flow direction is now brought into a quasi countercurrent contact through the plates 9 with the gas that flows from the adjacent planar preheating passage 11 or planar preheating passages 11 toward the collecting chamber 15. The collecting chamber 15 is positioned opposite to the outlet 7, whereas the distribution chamber 23 is accordingly positioned opposite to the inlet 5. This accomplishes, by simple construction and at the same time efficaciously, that the flow directions of the inflowing and outflowing gases cross each other. This produces the most possible exchange of heat. Through this heat exchange the ozone-free gas flowing from the reaction chamber 3 over to the distribution chamber 23 toward the outlet 7 is cooled down to just about the same temperature as the gas that contains the ozone and flows into the planar preheating passage 11 through the inlet 5, while the gas containing ozone is concomitantly heated up in the process.

Figure 2A:
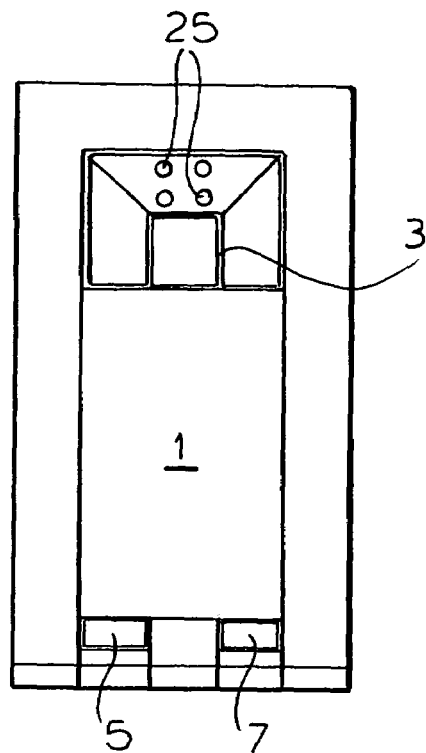
FIG. 2a is a schematic representation of the device according to the present invention including a heat-exchanger and a reaction chamber integrated in one housing.
Figure 2B:
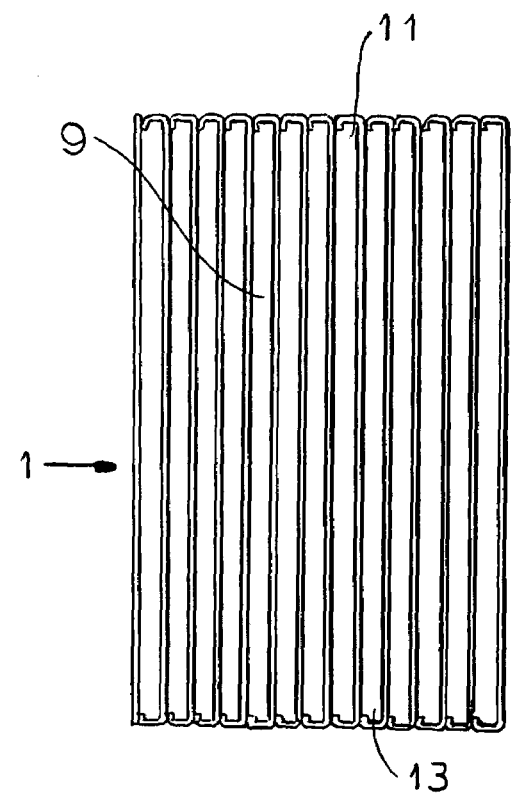
FIG. 2b is a schematic representation of the heat-exchanger plates in relation to their preheating and planar cooling passages.
Figure 2C:
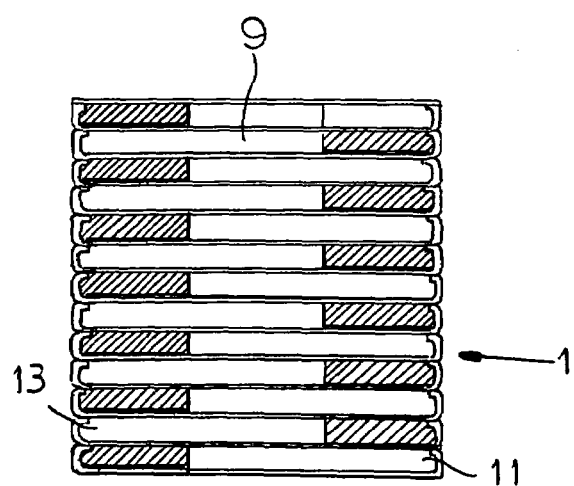
FIG. 2c is a schematic representation of the heat-exchanger plates in relation to their preheating and planar cooling passages in a perspective rotated by an angle of 90°.

In FIGS. 2*a*-2*c* details of the ozone destroyer according to the present invention are shown once again as a schematic representation. FIG. 2*a* shows the arrangement of the heat-exchanger 1 relative to the reaction chamber 3. Connections for the heating elements 19 and 21 are designated as 25.

The arrangement of the preheating and planar cooling passages 11, 13 formed between closely juxtaposed plates 9 of the heat-exchanger 1, intended to guarantee close heat contact, is shown in FIG. 2*b* and, additionally, in FIG. 2*c* in a modified perspective only.

Exemplary construction data applying to the recuperative heat-exchanger according to the present invention are presented in the following Table 1.

TABLE 1

| Number of Stages | Passage Width [mm] | Passage length [mm] |
| --- | --- | --- |
| 6 | 10 | 250 |

Additional Table 2 indicates the temperatures of the gas, its respective ozone concentrations, and the pressure drop, each measured at inlet 5 and outlet 7. The temperature inside the reaction chamber 3 amounted to approximately 380° C.

TABLE 2

| T [° C.] Inlet | T [° C.] Outlet | $O^3$/Inlet [g/m$^3$] | $O^3$/Outlet [g/m$^3$] | Gas Flow m$^3$/h | Δp [mbar] |
| --- | --- | --- | --- | --- | --- |
| 20 | 70 | 100 | 0 | 2 | 0.05 |

As shown in Table 2, heat-exchanger 1 has a high rate of heat recovery, while the ozone in the gas is completely destroyed and the pressure difference is low. Thus, the very high heat recovery values can also be achieved under very economically.

The recuperative heat-exchanger 1 employed according to invention is hence distinguished by an extraordinary heat transfer which is 3 to 5 times better than when shell-and-tube exchangers are used. In addition, depending on the design, the spatial requirement of the recuperative heat-exchanger 1 is up to 90% less compared to a shell- and tube exchanger. Transport and installation of the device is therefore easy.

It is therefore self-evident that the device according to the present invention representing a combination of plate heat-exchanger 1 and reaction chamber 3, equipped with electrical heating element(s) 19, 21, may be used just as well in any other applications in which ozone needs to be thermally destroyed, in particular, when ozone is present in high concentrations in dry or humid gases. For example, waste-water purification or bleaching of paper may be mentioned in this regard, since extremely high ozone concentrations also exist here.

In general, the specific advantage of the invented device and the invented method is that very high ozone concentrations can be destroyed economically and completely.

We claim:

1. A device for deozonating an ozone-containing gas, the device comprising:
   a reaction chamber for ozone destruction;
   a collecting chamber on an upstream side of the reaction chamber;
   a distribution chamber on a downstream side of the reaction chamber;
   a heat exchanger having a plurality of juxtaposed plates defining at least one planar preheating passage and, in heat-exchange contact therewith, at least one planar cooling passage, the cooling passage being connected to the distributing chamber and the preheating passage being connected to the collecting chamber; and
   means including an inlet opening into the planar preheating passage and an outlet opening into the cooling passage for passing ozone-containing gas into the preheating passage and collecting chamber to the reactor chamber where ozone in the gas is destroyed and thence out through the distribution chamber and the cooling passage, whereby incoming gas in the preheating chamber is heated by indirect heat exchange with outgoing gas in the cooling chamber and outgoing gas in the cooling chamber is cooled by incoming gas in the preheating chamber.

2. The deozonating device defined in claim 1 wherein the planar preheating passage and planar cooling passage are so oriented relative to each other and to the inlet and outlet that gases flow in generally opposite directions in the preheating and cooling passages.

3. The deozonating device defined in claim 1 wherein there are a plurality of such planar cooling passages between the distribution chamber and the outlet and a plurality of planar preheating passages between the inlet and the collecting chamber.

4. The deozonating device defined in claim 3 wherein there is at least one more planar cooling passage than preheating passages.

5. The deozonating device defined in claim 3 wherein the preheating passages are alternated with the cooling passages.

6. The deozonating device defined in claim 1, further comprising
   means in the reaction chamber for heating gases passing therethrough.

7. The deozonating device defined in claim 1 wherein the collecting chamber and the outlet of the cooling passage are at opposite ends of the device and the distributing chamber and the inlet of the preheating passage are at opposite ends.

8. A method of deozonating an ozone-containing gas, the method comprising the steps of:
   forming on opposite sides of a substantially planar heat-conducting plate a preheating passage having an inlet and a cooling passage having an outlet;
   flowing an ozone-containing gas from the inlet through the preheating passage, then through a collecting chamber, a reaction chamber, a distributing chamber, and the cooling passage to the outlet;
   heating the gas in the reaction chamber and thereby thermally destroying ozone in the gas; and
   exchanging heat through the plate between the gas in the cooling chamber and the gas in the preheating chamber, whereby the gas in the cooling chamber is cooled and the gas in the preheating chamber is heated.

9. The deozonating method defined in claim 8, further comprising the step of:
   flowing gas in the preheating passage in a direction generally opposite to a direction of flow of gas in the cooling passage.

10. The deozonating method defined in claim 8 wherein gas is heated in the reaction chamber to at least 300° C.

11. The deozonating method defined in claim 8 wherein gas is heated in the reaction chamber to 350° C.

12. The deozonating method defined in claim 8 wherein gas is heated in the reaction chamber to more than 350° C.

* * * * *